(12) United States Patent
Rouleau et al.

(10) Patent No.: US 9,862,403 B1
(45) Date of Patent: Jan. 9, 2018

(54) MANUALLY RETRACTABLE STEERING COLUMN ASSEMBLY FOR AUTONOMOUS VEHICLE

(71) Applicant: STEERING SOLUTIONS IP HOLDING CORPORATION, Saginaw, MI (US)

(72) Inventors: James E. Rouleau, Burt, MI (US); Todd M. King, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/363,517

(22) Filed: Nov. 29, 2016

(51) Int. Cl.
*B62D 1/181* (2006.01)
*B62D 1/183* (2006.01)
*B62D 1/185* (2006.01)

(52) U.S. Cl.
CPC ............. *B62D 1/183* (2013.01); *B62D 1/181* (2013.01); *B62D 1/185* (2013.01)

(58) Field of Classification Search
CPC .................................................... B62D 1/183
See application file for complete search history.

(56) References Cited

U.S. PATENT DOCUMENTS

| 4,138,167 A | 2/1979 | Ernst et al. |
| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |

(Continued)

FOREIGN PATENT DOCUMENTS

| CN | 1722030 A | 1/2006 |
| CN | 1736786 A | 2/2006 |

(Continued)

OTHER PUBLICATIONS

China Patent Application No. 201510204221.5 Second Office Action dated Mar. 10, 2017, 8 pages.

(Continued)

*Primary Examiner* — Nicole T Verley
(74) *Attorney, Agent, or Firm* — Cantor Colburn LLP

(57) ABSTRACT

A manually retractable steering column assembly includes a retractable portion translatable upon exertion of a manual force applied by a driver, the retractable portion restricted to a first translation range during a standard driving mode and translatable within a second translation range during an autonomous driving mode, the second translation range greater than the first translation range.

21 Claims, 2 Drawing Sheets

(56) References Cited

U.S. PATENT DOCUMENTS

| | | |
|---|---|---|
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A * | 6/2000 | Pollmann ............ B60R 25/0221 |
| | | 180/287 |
| 6,170,862 B1 | 1/2001 | Hoagland et al. |
| 6,227,571 B1 * | 5/2001 | Sheng .................... B62D 1/197 |
| | | 280/731 |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,578,449 B1 | 6/2003 | Anspaugh et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 * | 2/2008 | Monash ................ B60R 25/021 |
| | | 74/492 |
| 2008/0238068 A1 | 10/2008 | Kumar et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |

(56) References Cited

U.S. PATENT DOCUMENTS

| | | | |
|---|---|---|---|
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2015/0375769 A1* | 12/2015 | Abboud | B62D 1/181 74/493 |
| 2016/0009332 A1 | 1/2016 | Sirbu | |
| 2016/0075371 A1 | 3/2016 | Varunjikar et al. | |
| 2016/0082867 A1 | 3/2016 | Sugioka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1* | 7/2016 | Sugioka | B62D 1/183 74/493 |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1* | 8/2016 | Bendewald | B60W 50/08 |
| 2016/0318540 A1 | 11/2016 | King | |
| 2016/0318542 A1 | 11/2016 | Pattok et al. | |
| 2016/0347347 A1 | 12/2016 | Lubischer | |
| 2016/0347348 A1 | 12/2016 | Lubischer | |
| 2016/0362084 A1 | 12/2016 | Martin et al. | |
| 2016/0362117 A1 | 12/2016 | Kaufmann et al. | |
| 2016/0362126 A1* | 12/2016 | Lubischer | B62D 1/183 |
| 2016/0368522 A1* | 12/2016 | Lubischer | B62D 1/181 |
| 2016/0375860 A1* | 12/2016 | Lubischer | B60R 21/203 74/493 |
| 2016/0375923 A1* | 12/2016 | Schulz | B62D 1/02 74/493 |
| 2016/0375925 A1 | 12/2016 | Lubischer et al. | |
| 2016/0375926 A1 | 12/2016 | Lubischer et al. | |
| 2016/0375927 A1 | 12/2016 | Schulz et al. | |
| 2016/0375928 A1 | 12/2016 | Magnus | |
| 2016/0375929 A1 | 12/2016 | Rouleau | |
| 2016/0375931 A1 | 12/2016 | Lubischer | |
| 2017/0029009 A1 | 2/2017 | Rouleau | |
| 2017/0029018 A1 | 2/2017 | Lubischer | |
| 2017/0113712 A1 | 4/2017 | Watz | |

FOREIGN PATENT DOCUMENTS

| | | |
|---|---|---|
| CN | 101041355 A | 9/2007 |
| CN | 101596903 A | 12/2009 |
| CN | 102452391 A | 5/2012 |
| CN | 103419840 A2 | 12/2013 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | H05162652 A | 6/1993 |
| KR | 20100063433 A | 6/2010 |
| WO | 2006099483 A1 | 9/2006 |
| WO | 2010082394 A1 | 7/2010 |
| WO | 2010116518 A1 | 10/2010 |

OTHER PUBLICATIONS

CN Patent Application No. 201210599006.6 First Office Action dated Jan. 27, 2015, 9 pages.

CN Patent Application No. 201210599006.6 Second Office Action dated Aug. 5, 2015, 5 pages.

CN Patent Application No. 201310178012.9 First Office Action dated Apr. 13, 2015, 13 pages.

CN Patent Application No. 201310178012.9 Second Office Action dated Dec. 28, 2015, 11 pages.

CN Patent Application No. 201410089167 First Office Action and Search Report dated Feb. 3, 2016, 9 pages.

EP Application No. 14156903.8 Extended European Search Report, dated Jan. 27, 2015, 10 pages.

EP Application No. 14156903.8 Office Action dated Nov. 16, 2015, 4 pages.

EP Application No. 14156903.8 Office Action dated May 31, 2016, 5 pages.

EP Application No. 14156903.8 Partial European Search Report dated Sep. 23, 2014, 6 pages.

EP Application No. 15152834.6 Extended European Search Report dated Oct. 8, 2015, 7 pages.

European Application No. 12196665.9 Extended European Search Report dated Mar. 6, 2013, 7 pages.

European Search Report for European Application No. 13159950.8; dated Jun. 6, 2013; 7 pages.

European Search Report for related European Application No. 15152834.6, dated Oct. 8, 2015; 7 pages.

Gillespie, Thomas D.; "Fundamentals of Vehicle Dynamics"; Society of Automotive Engineers, Inc.; published 1992; 294 pages.

Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

Partial European Search Report for related European Patent Application No. 14156903.8, dated Sep. 23, 2014, 6 pages.

Van Der Jagt, Pim; "Prediction of steering efforts during stationary or slow rolling parking maneuvers"; Jul. 2013, 20 pages.

Varunjikar, Tejas; Design of Horizontal Curves With DownGrades Using Low-Order Vehicle Dynamics Models; A Theisis by T. Varunkikar; 2011; 141 pages.

* cited by examiner

MANUALLY RETRACTABLE STEERING COLUMN ASSEMBLY FOR AUTONOMOUS VEHICLE

BACKGROUND OF THE INVENTION

The embodiments described herein relate to retractable steering column assemblies and, more particularly, to a manually retractable steering column assembly for an autonomous vehicle.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available to a driver. Many vehicles with stowable columns during autonomous driving utilize power column actuators to move the column into the stowed position. However, manually adjusted columns do not have stow capability and do not have the ability to communicate a driving mode status to potential autonomous system(s).

SUMMARY OF THE INVENTION

According to one aspect of the disclosure, a manually retractable steering column assembly includes a retractable portion translatable upon exertion of a manual force applied by a driver. Also included is a stationary portion defining a slot path at least partially defined by a first end wall and a second end wall. Further included is a member operatively coupled to, and projecting outwardly from, the retractable portion. Yet further included is a gate operatively coupled to the stationary portion proximate the second end wall, the gate having an edge protruding into the slot path, the member extending through, and moveable within, the slot path during translation of the retractable portion, the first end wall and the edge of the gate defining a first translation range of the retractable portion available during a standard driving mode, the gate moveable to dispose the edge of the gate out of the slot path to allow a second translation range of the retractable portion available during an autonomous driving mode.

According to another aspect of the disclosure, a manually retractable steering column assembly includes a retractable portion translatable upon exertion of a manual force applied by a driver, the retractable portion restricted to a first translation range during a standard driving mode and translatable within a second translation range during an autonomous driving mode, the second translation range greater than the first translation range.

According to yet another aspect of the invention, a manually retractable steering column assembly for an autonomous vehicle includes a retractable portion translatable upon exertion of a manual force applied by a driver. Also included is a stationary portion defining a slot path at least partially defined by a first end wall and a second end wall. Further included is a member operatively coupled to, and projecting outwardly from, the retractable portion. Yet further included is a gate operatively coupled to the stationary portion proximate the second end wall, the gate restricting translation of the retractable portion to a first translation range during a standard driving mode, the gate moveable to allow a second translation range during an autonomous driving mode, the gate having a contoured recess for receiving the member in the autonomous driving mode, the member removable from the contoured recess to translate the retractable portion to the first translation range upon exertion of a force on the retractable portion toward the first end wall of the slot path.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is a portion of a steering column assembly 10. The steering column assembly 10 facilitates translation of a steering wheel (not shown) and a steering shaft in a manually retractable manner. This is particularly beneficial in embodiments where the assembly 10 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft toward, and possibly into, the instrument panel (e.g., dash) greatly enhances user comfort by providing a driver with more space when compared to typical ranges of repositioning available to a driver. The additional space provided facilitates additional workspace area or leg room, for example.

The embodiments described herein provide a manually retractable steering column which allows the steering wheel to be retracted to a greater extent while the vehicle is in an autonomous, or semi-autonomous, driving mode. The operating conditions described herein for the steering wheel are standard driving mode and an autonomous driving mode.

Figure 1:
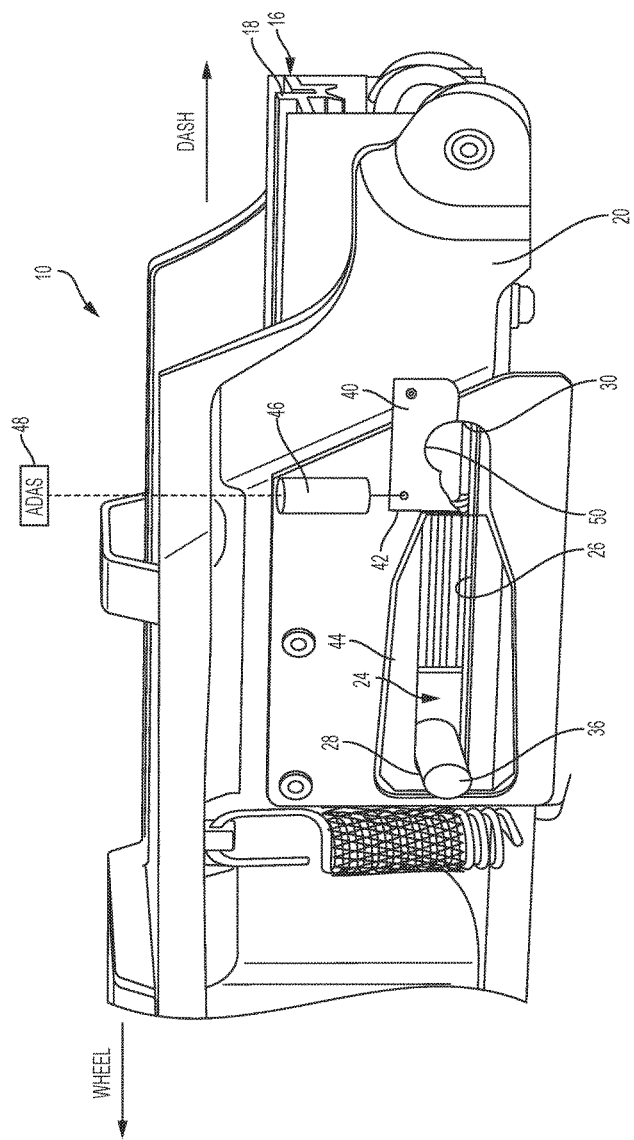
FIG. 1 is a perspective view of a retractable steering column assembly in a first position.

In the standard driving mode, the steering column assembly 10 is extended to a location that disposes the steering wheel in a position that is comfortably reached by a driver in a manner that allows the driver to fully handle and control the steering wheel. Adjustment over a first range of extended positions is possible in the standard driving mode, as shown in FIG. 1. During the standard driving mode, the driver may activate the ADAS through a vehicle interface, such as a switch or button. The steering column may be at least partially retracted in a manual manner into the instrument panel of the vehicle during a transition mode.

Figure 2:
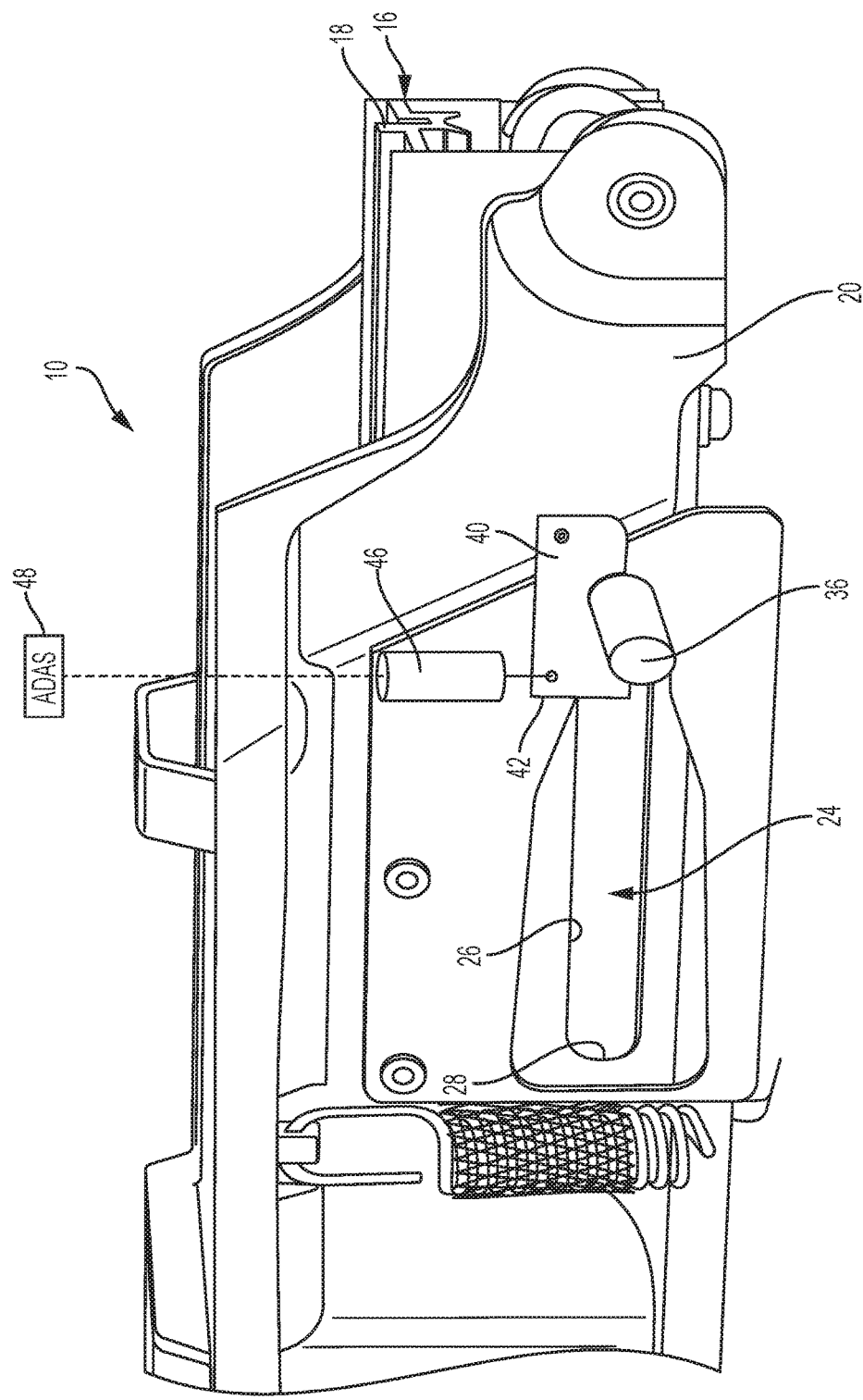
FIG. 2 is a perspective view of the retractable steering column assembly in a second position.

Extension and retraction of the steering column assembly 10 refers to translation of a retractable portion 16 of the steering column assembly 10. The retractable portion 16 includes one or more components that are translatable. For example, in addition to the aforementioned steering wheel and the steering shaft, a moveable portion 18, which may also be referred to as an upper jacket in some embodiments, is translatable relative to a stationary portion 20, which may be referred to as a lower jacket in some embodiments. In the autonomous driving mode, a second range of translation, or retraction, is available to the driver, with the second range of translation being greater than the first range that is available in the standard driving mode, as shown in FIG. 2 and as appreciated from the description herein. The second range of translation available to a driver allows for retraction of the steering column assembly 10 further into the instrument panel compared to the first range of translation.

The steering column assembly includes a member 36 that is operatively coupled to the moveable portion 18, and projects outwardly from the moveable portion 18. The member 36 projects through a slot 24 (also referred to herein as a slot path) defined by the stationary portion 20 of the steering column assembly 10 and partially constrained therein. In particular, the slot 24 is at least partially defined by a slot wall 26 having a first end wall 28 and a second end wall 30. The slot 24 extends substantially axially with respect to the longitudinal direction of the steering column assembly 10. The member 36 may include any variety of shapes, and may be a pin that may be substantially cylindrical, for example.

A gate 40 is operatively coupled to the stationary portion 20 proximate the second end wall 30 of the slot 24. The gate 40 may be formed of any shape, but includes an edge 42 regardless of the particular geometry. In the standard driving mode, the gate 40 is positioned to dispose at least a portion of the edge 42 within the slot 24 to limit the telescoping travel of the moveable portion 18 of the steering column assembly 10 by impeding the travel within the slot 24 of the member 36 protruding from the moveable portion 18. Specifically, the first end wall 28 and the edge 42 of the gate 40 define the above-described first range of translation. The boundary labeled with numeral 44 defines the full range of motion of the member 36, and therefore the moveable portion 18, in some embodiments (FIG. 1). Boundary 44 includes the first range of translation and a tilt, or rake, motion.

The gate 40 is moveable to remove the edge 42 from the slot 24 to avoid impeding the member 36 from additional translation. Upon removal of the edge 42 from the slot 24, the second range of translation is available to a driver. The second range of translation is only available when the vehicle is operated in the autonomous driving mode. Upon initiation of the autonomous driving mode, the gate 40 is moved to remove the edge 42 from the slot 24. This is carried out with an actuator 46 operatively coupled to the gate 40. The actuator 46 may be any suitable actuator, such as a solenoid or electric motor, for example. The actuator 46 is in operative communication with the ADAS 48 to determine if the vehicle is in the autonomous driving mode or the standard driving mode. The operative communication between the actuator 46 and the ADAS 48 may be wired or wireless. If the ADAS is activated (i.e., vehicle is in autonomous driving mode), the ADAS 48 provides a signal to the actuator 46 to impart movement of the gate 40 to remove the edge 42 from the slot 24. The ADAS may include a sensor or any other position detection structure to determine if the moveable portion 18 of the steering column assembly 10 is in a retracted condition (i.e., stowed position of steering column assembly 10).

Movement of the gate 40 may be carried out in several contemplated manners. For example, the actuator 46 may translate the gate 40 within a plane or may rotate the gate 40. Furthermore, a combination of translation and rotation may occur. Irrespective of the particular movement of the gate 40, the edge 42 is removed from the slot 24 to allow the member 36 to translate further along the slot 24.

The gate 40 also includes a contoured recess 50 that retains the member 36. In some embodiments, the contoured recess 50 includes an angled portion or portion with curvature that allows the vehicle operator to manually withdraw the steering column assembly from the stowed position to an extended position. The driver simply manually unclamps the steering column assembly 10 and exerts a manual force on the moveable portion 18 in a direction away from the instrument panel. In the stowed position, the member 36 is positioned within the contoured recess 50, but is removable upon exertion of the manual force based on the geometry of the angled portion. In particular, the angled portion or portion with curvature facilitates movement of the gate 40 during sliding of the member 36 therealong. Such motion allows the member 36 to be released from the contoured recess 50 of the gate 40 to place the member 36 in the portion of the slot 24 that restricts motion to the first range of translation. In an embodiment having this angled feature, the driver can disengage the ADAS by moving the steering column from the stowed position. In other embodiments, an angled feature is not present. Such embodiments require the ADAS system to activate the gate 40 via the actuator 46 before the column may be released from the stowed position.

The embodiments described herein facilitate conditional stowing of manually adjusted steering columns and enables ADAS with stowable columns in vehicles which do not package power adjustable columns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A manually retractable steering column assembly comprising:
  a retractable portion translatable upon exertion of a manual force applied by a driver;
  a stationary portion defining a slot path at least partially defined by a first end wall and a second end wall;
  a member operatively coupled to, and projecting outwardly from, the retractable portion; and
  a gate operatively coupled to the stationary portion proximate the second end wall, the gate having an edge protruding into the slot path, the member extending through, and moveable within, the slot path during translation of the retractable portion, the first end wall and the edge of the gate defining a first translation range of the retractable portion available during a standard driving mode, the gate moveable to dispose the edge of the gate out of the slot path to allow a second translation range of the retractable portion available during an autonomous driving mode.

2. The assembly of claim 1, wherein the gate includes a contoured recess for receiving the member in the autonomous driving mode, the member removable from the contoured recess to translate the retractable portion to the first translation range upon exertion of a force on the retractable portion toward the first end wall of the slot path.

3. The assembly of claim 1, further comprising an actuator operatively coupled to the gate to impart movement of the gate.

4. The assembly of claim 3, wherein the actuator comprises an electric motor.

5. The assembly of claim 3, wherein the actuator comprises a solenoid.

6. The assembly of claim 3, wherein the actuator is in operative communication with an advanced driver assist system (ADAS) to determine if a vehicle is in the autonomous driving mode or the standard driving mode.

7. The assembly of claim 6, wherein the ADAS comprises a sensor to determine if the retractable portion is in a stowed condition.

8. The assembly of claim 3, wherein the actuator translates the gate.

9. The assembly of claim 3, wherein the actuator pivots the gate.

10. The assembly of claim 1, wherein the member comprises a cylindrical pin.

11. A manually retractable steering column assembly comprising a retractable portion translatable upon exertion of a manual force applied by a driver, and a stationary portion attached thereto, the retractable portion restricted to a first translation range during a standard driving mode and translatable within a second translation range during an autonomous driving mode, a gate operatively coupled to the stationary portion, the gate restricting translation of the retractable portion to the first translation range during the standard driving mode, the gate moveable to allow the second translation range during the autonomous driving mode, the second translation range greater than the first translation range.

12. A manually retractable steering column assembly for an autonomous vehicle comprising:
 a retractable portion translatable upon exertion of a manual force applied by a driver;
 a stationary portion defining a slot path at least partially defined by a first end wall and a second end wall;
 a member operatively coupled to, and projecting outwardly from, the retractable portion; and
 a gate operatively coupled to the stationary portion proximate the second end wall, the gate restricting translation of the retractable portion to a first translation range during a standard driving mode, the gate moveable to allow a second translation range during an autonomous driving mode, the gate having a contoured recess for receiving the member in the autonomous driving mode, the member removable from the contoured recess to translate the retractable portion to the first translation range upon exertion of a force on the retractable portion toward the first end wall of the slot path.

13. The assembly of claim 12, further comprising an actuator operatively coupled to the gate to impart movement of the gate.

14. The assembly of claim 13, wherein the actuator comprises an electric motor.

15. The assembly of claim 13, wherein the actuator comprises a solenoid.

16. The assembly of claim 13, wherein the actuator is in operative communication with an advanced driver assist system (ADAS) to determine if a vehicle is in the autonomous driving mode or the standard driving mode.

17. The assembly of claim 16, wherein the ADAS comprises a sensor to determine if the retractable portion is in a stowed condition.

18. The assembly of claim 13, wherein the actuator translates the gate.

19. The assembly of claim 13, wherein the actuator pivots the gate.

20. The assembly of claim 12, wherein the member comprises a cylindrical pin.

21. A manually retractable steering column assembly comprising a retractable portion translatable upon exertion of a manual force applied by a driver, the retractable portion restricted to a first translation range during a standard driving mode and translatable within a second translation range during an autonomous driving mode, the second translation range having an autonomous range outside the first translation range, the retractable portion configured to be manually extensible from the autonomous range to the first translation range.

* * * * *